Feb. 4, 1941.  E. J. MAUST  2,230,782
DISCHARGE MECHANISM FOR HINDERED SETTLING CLASSIFIERS
Filed Sept. 13, 1939
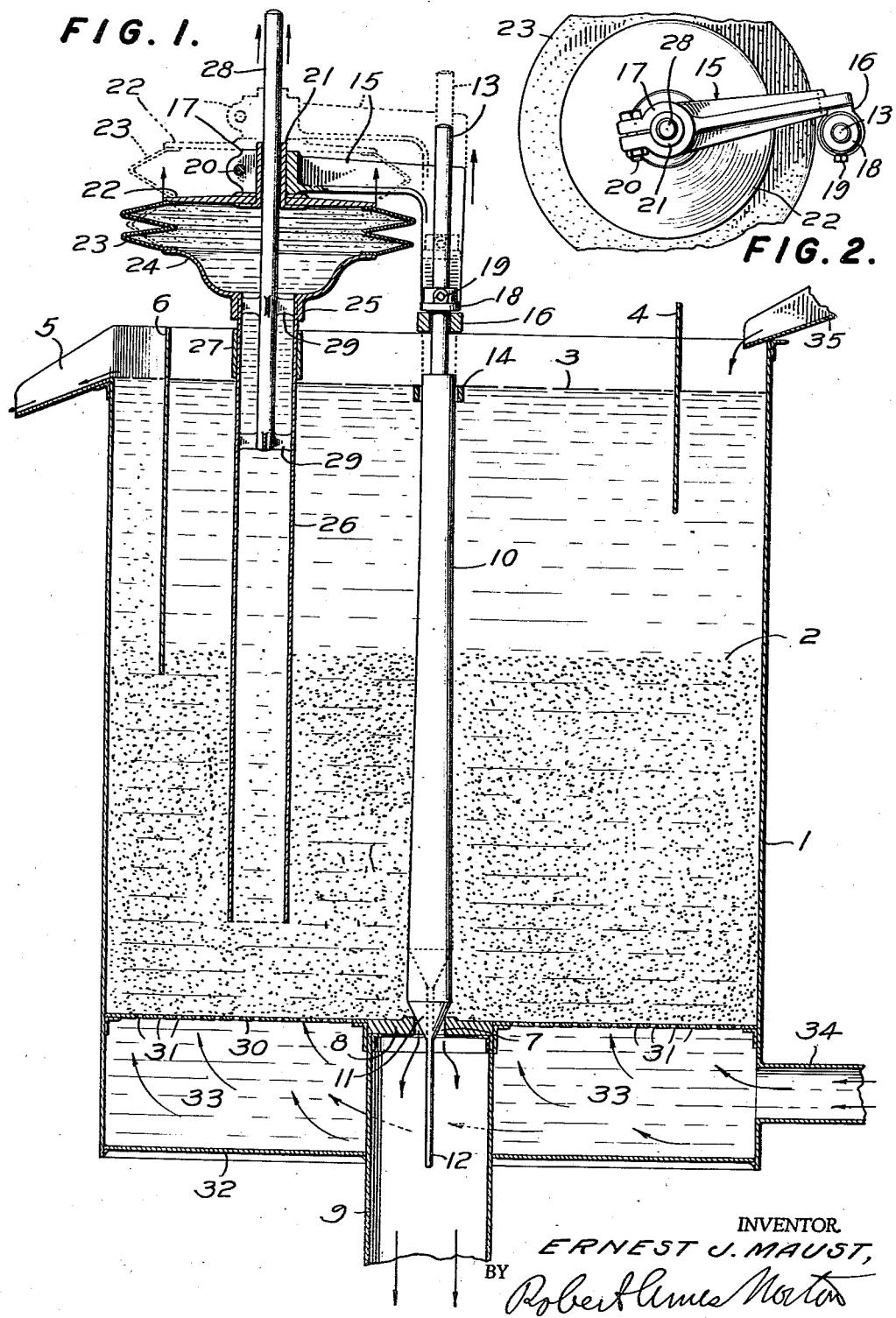
INVENTOR.
ERNEST J. MAUST,
BY Robert Ames Norton
ATTORNEY.

Patented Feb. 4, 1941

2,230,782

UNITED STATES PATENT OFFICE 2,230,782

DISCHARGE MECHANISM FOR HINDERED SETTLING CLASSIFIERS

Ernest J. Maust, Brewster, Fla., assignor to American Cyanamid Company, New York, N. Y., a corporation of Maine Application September 13, 1939, Serial No. 294,579

3 Claims. (Cl. 209—496)

This invention relates to the discharge mechanism for hindered settling classifiers.

A type of hindered settling classifiers to discharge solid suspensions of different particle size has obtained considerable use in a number of arts notably in ore dressing arts. The well known Fahrenwald apparatus is a typical example of this class and is widely used in various sizing operations, a typical one being in the sizing of Florida pebble phosphate. The hindered settling type of classifier consists essentially of a container into which a suspension of various particle size is fed and provided with means, usually hydraulic, which cause the materials to be stratified in the suspension according to particle size. The coarser or heavier particles form a strata or layer at the bottom, the intermediate particles additional layers, and the lighter and smaller particles form an upper layer. The sizer is provided with two discharges; one an overflow for fine material, usually baffled to prevent carrying out of coarse material by velocity, and a discharge for coarse material in the bottom of the container.

It is an object of the present invention to provide a novel and improved mechanism for controlling the discharge of the material from the hindered settling type classifier effecting a separation of the lighter material.

When a pulp or suspension containing solid materials of varying particle size is fed into a hindered settling type classifier, the particles near the bottom are met by upward flowing streams of hydraulic water which keep the mixture of solids and water in constant agitation or suspension. As the proportion of heavy particles increases in this zone of agitation or "teeter" column, as referred to in the art, there is also an increase in specific gravity. When a standpipe containing water extends almost to the bottom of the container, the higher specific gravity of the teeter column tends to cause the water in the standpipe to rise above the water level in the sizer itself, due to hydrostatic pressure. The height to which the water level rises is determined by, and bears a direct relation to, the specific gravity of the column of suspension or teeter column. The larger the particle size, the greater specific gravity and hence the greater super-elevation of the water in the standpipe. The hydrostatic pressure of the super-elevation water in such standpipes has been used to operate discharge valves for the coarse material. For example, it has been proposed in the past to arrange the discharge valve for coarse material within the standpipe in the form of an oversized needle valve, the operation of the valve being effected by the movement of a flexible diaphragm under the pressure of the water in the standpipe. When the diaphragm moves up under the influence of the water in the standpipe to a sufficient point, the diaphragm raises the needle valve from its seat and coarse material is discharged from the bottom of the sizer until the level of the coarse suspension drops to a point where there is a decrease in specific gravity of the teeter column and hence a decrease in hydrostatic pressure in the standpipe causing the super-elevation water to drop, closing the valve.

The ordinary type of flexible diaphragm used heretofore to operate the needle valve is open to serious objections. With a plain flexible diaphragm such as used by the prior art, there is a range of only about 2 inches over which it is readily possible to have diaphragms trip the discharge valve. This range is not practical for a classification operation similar to that used on phosphate rock where there is a continual change in the type of product desired and in the nature of the feed. With flexible type diaphragms of such limited range, it is necessary to raise and lower the entire diaphragm mechanism at frequent intervals to effect classification over a desired range when the feed varies in particle size. This is a laborous process requiring an operator. Unless the flexible rubber type diaphragm used is absolutely uniform in all its properties and dimensions, its movement under the pressure of the water in the standpipe may not be purely vertical and there is a lack of uniformity in area against which the super-elevation water can act to raise and lower the discharge mechanism. Such variations do not, therefore, give a true and uniform discharge rate conforming exactly to the density of the teeter column.

According to the preferred embodiment of the present invention the disadvantages of the prior art are avoided and a uniform and more reliable device is obtained by using a bellows diaphragm which permits a variable range and a more uniform actuation. The bellows diaphragm permits a rigid type diaphragm proper with accordion pleated bellows around its periphery. Thus, the bellows can be relatively flexible with respect to the diaphragm and no distortion of the diaphragm results. The rigid diaphragm assures a uniform area against which the super-elevation water can act to raise and lower the discharge mechanism and results in a uniform rate of discharge which bears a direct relation to the density of the teeter column.

With the improved bellows diaphragm the tripping point of the discharge valve is not limited to a narrow range, but can be anywhere within the flexing range of the bellows. In a practical embodiment, the tripping range permitted by the bellows may be approximately 10 inches. With this large range in tripping point the classifier is sufficiently flexible to make separations over a very wide range and is especially suitable to phosphate rock classification. It is very easy to adjust the classifier for any size particle range desired, by an adjustment on the discharge valve stem, which requires only a moment's work and hence does not require a man for that operation alone as previous classifiers frequently do, but can easily be taken care of by a man whose principal duties are concerned with other operations.

In the past, the discharge valve for the coarse material in the form of the over-sized needle valve, was arranged in the standpipe and operated by means of the flexible diaphragm located at the top of the standpipe. The improved flexibility and uniformity of results as produced by the bellows type diaphragm, while producing results superior to past methods embodying ordinary diaphragms, does not entirely eliminate certain difficulties caused by the location of the discharge valve. When the valve stem is located in the standpipe there is a tendency for solid particles to become wedged into the small space between the valve stem and the wall of the standpipe, causing the valve to stick or become difficult to operate. It has been proposed to avoid this difficulty of sand entering the standpipe between the valve and the pipe, to introduce a flow of water under the diaphragm downwardly through the standpipe. However, this has not proven to be entirely satisfactory. In a preferred embodiment of the present invention, the disadvantages of the prior art caused by the valve location are avoided by arranging the standpipe and the valve adjacent to each other, but with the valve being outside of the standpipe, the valve being operatively connected to the flexible diaphragm located at the top of the standpipe.

The advantages of the present invention, as will be readily apparent to those skilled in the art are: a diaphragm is provided that can move steadily up and down like a piston in response to changes in specific gravity of the teeter column and is not subject to horizontal distortion or change in area; a discharge valve is provided which is non-clogging since there is no tendency for sand to enter the standpipe and therefore no need for a flow of water down through the standpipe with its resulting increase in complexity in the discharge mechanism and inaccuracy of operation.

The invention will be described in greater detail in connection with the drawing in which Fig. 1 shows a vertical section through a hindered settling sizer embodying the discharge mechanism of the present invention and Fig. 2 is a top view of the valve operating mechanism.

In Fig. 1 a sizer compartment is shown at 1 with the teeter column level of suspended solids at 2 and the normal water level at 3. Feed is introduced at one side back of baffle 4 and overflow 5 on the opposite side leads to an overflow outlet. The overflow is likewise baffled by the baffle 6. A coarse discharge opening 7 is provided in the plate 8 at the bottom of the sizer leading to a discharge pipe 9. This opening is nearly closed by the needle valve 11 having the seat guiding point 12 and the shaft 10 which has the extended portion 13 provided with a clamped collar 18 and operatively connected to arm 15 by means of the bearing 16 below the collar 18 in which the shaft 13 is free to slide vertically. The valve shaft 10 is held in a vertical position by the support member 14 in which the shaft is free to move vertically.

The operation of the valve 11 is controlled by the rise of water in a standpipe 26 extending from near the bottom of the teeter column up above the normal water level in the sizer and held rigidly in position by support member 27. The upper end of the standpipe 26 has an enlarged chamber 24 held in position by flange 25, and on top of which is a rigid diaphragm 22 connected at its periphery to the outer portion of the chamber 24 through a flexible bellows 23. In the center of the diaphragm 22 is a bearing sleeve 21 which fits around and is free to slide vertically along the guide rod 28 which is rigidly connected to the standpipe 26 by support members 29. The arm 15 is fastened to the bearing sleeve 21 by means of clamp 17.

The heavy particles at the bottom of the teeter column 2 rest on a plate 30 having perforations 31 through which a flow of hydraulic water from pipe 34 passes through a chamber 33 at the bottom of the container formed by the plate 30 and bottom plate 32.

In Fig. 2 a top view shows the rigid diaphragm 22 with the bearing sleeve 21 securely fastened to the diaphragm. The guide rod 28 is shown fitted closely in the bearing sleeve 21 in a manner that permits vertical motion but no horizontal motion. The portion of the discharge valve shaft 13 is shown with the collar 18 which is held in the desired position by the set screw 19.

The arm 15 is fastened to the bearing sleeve 21 by means of the clamp 17 and the bolt 20 and the bearing portion 16 of the arm 15 fits around the valve shaft portion 13 below the collar 18 in a manner that permits vertical motion.

In operation, a suspension of particles of various sizes is fed into the sizer compartment behind baffle 4 by means of a suitable feed through 35. The teeter column level 2 gradually builds up as particles settle and as coarser and coarser particles settle, the specific gravity of this column increases resulting in forcing the water in the standpipe 26 to a higher level in chamber 24. As the water level rises, the diaphragm 22 also rises, the sleeve 21 slides vertically along the guide rod 28 as it rises, and with it the arm 15 moves up on the shaft portion 13 of the valve 11 until the slidable bearing portion 16 or the arm 15 strikes the collar 18. Thereafter the valve 11 rises with it to the position as shown in dotted lines in Fig. 1 and coarse material is discharged through the discharge opening 7 into the pipe 9 until the teeter column level 2 falls sufficiently to again close the valve 11. In the meantime fine particles continuously flow off over the overflow 5, a continuous sizing is effected, and adjustment of the collar 18 by means of the set screw 19 determines the particle size at which the coarse discharge valve 11 opens.

In the sizer shown in the drawing, hydraulic water flows up through the perforations 31 in the constriction plate 30 in order to keep the sand particles in agitation or "teeter." The sand particles may be kept in teeter by other methods, for example, a solid plate may be used instead of a perforated plate, and a number of small pipes or nozzles used to direct water against the plate with sufficient force to provide the agitation or teeter necessary to maintain the constant motion of the solid particles.

What I claim is:

1. In a hindered settling hydraulic classifier having a classification chamber with fine overflow and coarse discharge valve opening in the bottom, the improvement which comprises a stationary standpipe having an open lower end adjacent the bottom of the classification chamber but spaced therefrom, said standpipe extending to a point above the normal water level thereof, a diaphragm connected to the standpipe through a bellows moved by changes in level of liquid in the standpipe, a needle valve seating in the coarse discharge valve opening in the bottom of the classification chamber and connecting means from the diaphragm to the needle valve stem for raising the latter from its seat when the diaphragm has moved beyond a predetermined level, said needle valve stem having adjustable means for readily determining the distance the diaphragm must move before the valve is unseated.

2. A hindered settling hydraulic classifier having a classification chamber with fine overflow and coarse discharge valve opening in the bottom, the improvement which comprises a stationary standpipe having an open lower end adjacent the bottom of the classification chamber but spaced therefrom, said standpipe extending to a point above the normal water level thereof, a movable diaphragm connected to the top of the standpipe through a bellows moved by changes in level of liquid in the standpipe, a needle valve seating in the coarse discharge valve opening in the bottom of the classification chamber and connecting means from the diaphragm to the needle valve stem for raising the valve from its seat when the diaphragm has moved beyond a predetermined level, said needle valve stem being external to and adjacent to the standpipe, and having adjustable means for readily determining the distance the diaphragm must move before the valve is unseated.

3. A hindered settling discharge mechanism according to claim 1 in which the standpipe at its upper end is enlarged to form a chamber and is provided with a rigid diaphragm connected at its periphery to the peripheries of the chamber through a bellows.

ERNEST J. MAUST.